(12) United States Patent
Tohara

(10) Patent No.: US 9,658,056 B2
(45) Date of Patent: May 23, 2017

(54) PROJECTION APPARATUS FOR MEASUREMENT SYSTEM BASED ON EXIT PUPIL POSITIONS

(71) Applicant: CANON KABUSHIKI KAISHA, Tokyo (JP)

(72) Inventor: Masakazu Tohara, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 14/666,865

(22) Filed: Mar. 24, 2015

(65) Prior Publication Data

US 2015/0288929 A1    Oct. 8, 2015

(30) Foreign Application Priority Data

Apr. 3, 2014   (JP) ................. 2014-076962

(51) Int. Cl.
*H04N 7/18*   (2006.01)
*G01B 11/02*  (2006.01)
*G03B 21/14*  (2006.01)
*G03B 17/54*  (2006.01)

(52) U.S. Cl.
CPC ............ *G01B 11/022* (2013.01); *G03B 17/54* (2013.01); *G03B 21/147* (2013.01)

(58) Field of Classification Search
CPC .................................................. G01B 11/022
See application file for complete search history.

(56) References Cited

U.S. PATENT DOCUMENTS

| 7,602,506 | B2 | 10/2009 | Hoffmann et al. |
| 8,836,766 | B1 | 9/2014 | Hebert et al. |
| 9,046,355 | B2 | 6/2015 | Takabayashi et al. |
| 9,147,247 | B2 | 9/2015 | Takabayashi |
| 9,200,899 | B2 | 12/2015 | Rueb |
| 2012/0172840 | A1 | 7/2012 | Guo et al. |
| 2016/0091311 | A1 | 3/2016 | Rueb |

FOREIGN PATENT DOCUMENTS

| CN | 101608908 A | 12/2009 |
| CN | 102014259 A | 4/2011 |
| CN | 102472613 A | 5/2012 |
| CN | 102954770 A | 3/2013 |
| CN | 103322943 A | 9/2013 |

(Continued)

OTHER PUBLICATIONS

Mar. 10, 2017 Chinese Office Action in Chinese Patent Appln. No. 201510144409.5.

*Primary Examiner* — Young Lee
(74) *Attorney, Agent, or Firm* — Fitzpatrick, Cella, Harper & Scinto

(57) ABSTRACT

The projection apparatus is used for a measurement system and projects a projection light onto an object. An image capturing apparatus performs, through an imaging optical system, image capturing of the object onto which the projection light is projected. The projection apparatus includes a projection optical system satisfying a condition of |EXP0−EXP1|/BL≤0.0015. EXP0 represents an exit pupil position of the projection optical system, EXP1 represents an actual exit pupil position of the projection optical system for a light ray of a maximum field angle in a measurable range for the object through the imaging optical system, and BL represents a base length between the projection optical system and the imaging optical system.

7 Claims, 6 Drawing Sheets

(56) References Cited

FOREIGN PATENT DOCUMENTS

| | | |
|---|---|---|
| DE | 10313191 A1 | 10/2004 |
| JP | 07-264577 A | 10/1995 |
| JP | 2001-133225 A | 5/2001 |
| JP | 2008-298589 A | 12/2008 |
| JP | 2004-508560 A | 4/2014 |
| WO | 2012/091794 A1 | 7/2012 |
| WO | 2013/076605 A1 | 5/2013 |

PROJECTION APPARATUS FOR MEASUREMENT SYSTEM BASED ON EXIT PUPIL POSITIONS

BACKGROUND OF THE INVENTION

Field of the Invention

The present invention relates to measurement system measuring an object by using a captured image acquired through image capturing of the object, and particularly to a projection apparatus projecting a measuring optical image onto the object and to an image capturing apparatus capturing an image of the object.

Description of the Related Art

In the above measurement system, distortion of a projection optical system of the projection apparatus and that of an imaging optical system of the image capturing apparatus deteriorate accuracy of a measurement result of the object. For this reason, correction of a component of the distortion (hereinafter referred to as "a distortion component") contained in the captured image on a basis of a function expressing the distortion has been conventionally performed.

Japanese Patent Laid-Open No. 07-264577 discloses a method of correcting a distortion component by using a pinhole model in which all light rays entering an imaging optical system pass through one point. Japanese Patent Laid-Open No. 2001-133225 discloses a method that produces, depending on a distance to an object, multiple functions to be used to correct a distortion component and changes the function to be used depending on the distance to the object. Japanese Patent Laid-Open No. 2008-298589 discloses a method of correcting a distortion component by using, not the pinhole model, but an optical system model in which an entrance pupil position of an imaging optical system is changed for respective field angles.

However, since an exit pupil position of the projection optical system and an entrance pupil position of the imaging optical system generally differ for light rays of respective field angles, the distortion components contained in the measuring optical image projected onto the object and in the captured image have different shapes depending on a distance from the object to the optical system. Therefore, the method disclosed in Japanese Patent Laid-Open No. 07-264577 which corrects the distortion component by using the pinhole model cannot perform correction with consideration for the different shapes of the distortion component depending on the distance to the object. As a result, this method cannot sufficiently correct the distortion component over an entire range in a depth direction (that is, an optical axis direction of the optical system) among three-dimensional directions.

The method disclosed in Japanese Patent Laid-Open No. 2001-133225 requires, in order to store the multiple functions provided for the correction of the distortion component depending on the distance to the object, a large memory capacity. Moreover, this method also requires a means to accurately measure the distance to the object, which makes a configuration of the system complicated.

Furthermore, the method disclosed in Japanese Patent Laid-Open No. 2008-298589 which uses the optical system model in which the entrance pupil position is changed for the respective field angles requires a lot of input images to acquire many parameters to be used for producing the model and also requires a complicated calculation process to acquire the parameters.

SUMMARY OF THE INVENTION

The present invention provides a projection apparatus and an image capturing apparatus to be used for constituting a measurement system capable of sufficiently correcting, an influence of distortion of each of a projection optical system and an imaging optical system over an entire measurable range including an optical axis direction and thereby capable of achieving a high measurement accuracy.

The present invention provides as an aspect thereof a projection apparatus to be used for a measurement system including the projection apparatus configured to project a projection light onto an object, and an image capturing apparatus provided with an imaging optical system and configured to perform, through the imaging optical system, image capturing of the object onto which the projection light is projected. The projection apparatus includes a projection optical system through which the projection light is projected onto the object. The projection optical system satisfies the following condition for the projection light:

$$|EXP0-EXP1|/BL \leq 0.0015$$

where EXP0 represents an exit pupil position of the projection optical system, EXP1 represents an actual exit pupil position of the projection optical system for a light ray of a maximum field angle in a measurable range for the object through the imaging optical system, and BL represents a base length between the projection optical system and the imaging optical system.

The present invention provides as another aspect thereof a measurement system including the above projection apparatus, an image capturing apparatus provided with an imaging optical system and configured to perform, through the imaging optical system, image capturing of the object onto which the projection light is projected, and a processing apparatus configured to perform a process to measure the object by using a captured image acquired by the image capturing apparatus.

The present invention provides as still another aspect thereof an image capturing apparatus to be used for a measurement system including the image capturing apparatus configured to perform image capturing of an object, and a processing apparatus configured to perform a process to measure the object by using a captured image acquired by the image capturing apparatus. The image capturing apparatus includes an imaging optical system through which the image capturing is performed. The imaging optical system satisfies the following condition for an image-capturing light entering from the object:

$$|ENP0-ENP1|/BL \leq 0.0015$$

where ENP0 represents an entrance pupil position of the imaging optical system, ENP1 represents an actual entrance pupil position of the imaging optical system for a light ray of a maximum field angle in a measurable range for the object through the imaging optical system, and BL represents one of (a) a base length between the imaging optical system of the image capturing apparatus performing the image capturing of the object from one place and the imaging optical system of the image capturing apparatus performing the image capturing of the object from another place and (b) a base length between a projection optical system and the imaging optical system when a projection light is projected onto the object through the projection optical system.

The present invention provides as yet still another aspect thereof a measurement system including above one or more above image capturing apparatuses, and a processing apparatus configured to perform a process to measure the object by using a captured image acquired by each image capturing apparatus.

Further features of the present invention will become apparent from the following description of exemplary embodiments with reference to the attached drawings.

DESCRIPTION OF THE EMBODIMENTS

Exemplary embodiments of the present invention will be described below with reference to the attached drawings.

Embodiment 1

Figure 1:
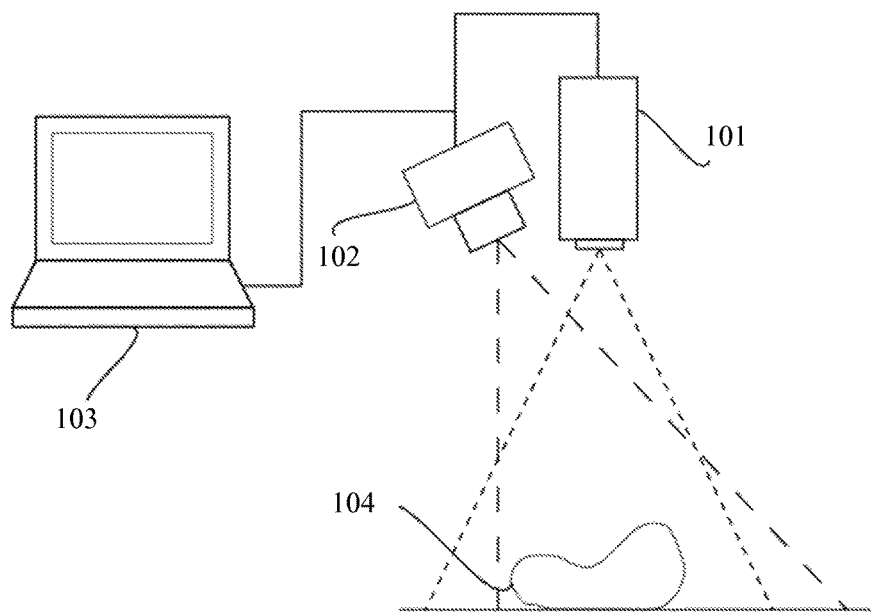
FIG. 1 shows a configuration of a three-dimensional shape measurement system that is Embodiment 1 of the present invention.

FIG. 1 shows a configuration of a three-dimensional shape measurement system that is a first embodiment (Embodiment 1) of the present invention. The three-dimensional shape measurement system of this embodiment is constituted by a projection apparatus 101, an image capturing apparatus 102 and a control/processing apparatus 103.

The projecting apparatus 101 projects an optical pattern as a measuring optical image onto an object 104 to be measured. The image capturing apparatus 102 performs image capturing of the object 104 onto which the optical pattern is projected. The control/processing apparatus 103 is constituted by a personal computer and controls operations of the projection apparatus 101 and the image capturing apparatus 102. The control/processing apparatus 103 further performs a process to measure a three-dimensional shape of the object 104 by using a captured image produced (acquired) by the image capturing apparatus 102.

The three-dimensional shape measurement system of this embodiment performs a three-dimensional shape measurement by a spatial coding method. Specifically, the projection apparatus 101 projects the optical pattern that is a bright and dark pattern onto the object 104. The image capturing apparatus 102 performs image capturing of the object 104 onto which the bright and dark pattern is projected. The control/processing apparatus 103 performs the process to measure the three-dimensional shape of object 104 by using the captured image including the bright and dark pattern, which is produced by the image capturing apparatus 102. More specifically, the control/processing apparatus 103 detects a bright and dark edge position of the bright and dark pattern in the captured image by a negative-positive intersection detection method and then calculates, from an angle formed at the detected edge position by an optical axis of a projection optical system of the projection apparatus 101 with an optical axis of an imaging optical system of the image capturing apparatus 102, a distance from the projection and image capturing apparatuses 101 and 102 to the object 104 by a principle of triangulation.

In the shape measurement, since the projection optical system of the projection apparatus 101 and the imaging optical system of the image capturing apparatus 102 each have distortion, in order to accurately measure the shape of the object 104, it is necessary to correct a distortion component contained in the captured image; the distortion component is an image component corresponding to the distortion. For this reason, the control/processing apparatus 103 in this embodiment performs a process to correct the distortion component by assuming that each of the projection optical system and the imaging optical system is an optical system 105 of a pinhole model as shown in FIG. 2.

The pinhole model assumes that light rays of all field angles proceeding from the projection optical system of the projection apparatus 101 toward the object 104 are emitted from a certain one point in the projection optical system and that light rays of all field angles entering the imaging optical system of the image capturing apparatus 102 from the object 104 are introduced to a certain one point in the imaging optical system. Use of such a pinhole model facilitates modeling of the optical system, eliminates complicated processing to calculate many parameters, unlike a case of using other models, and enhances process stability.

Figure 2:
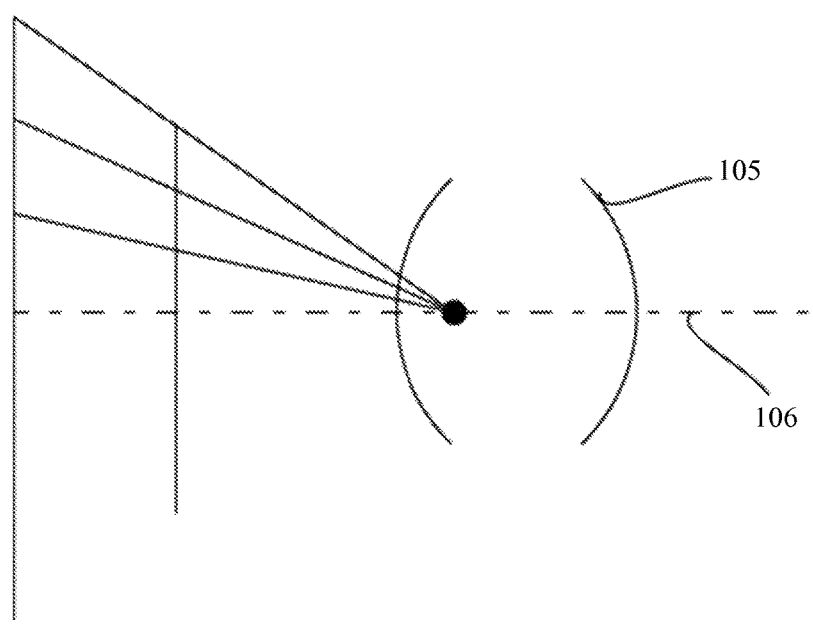
FIG. 2 shows an optical system of a pinhole model used in Embodiment 1.

As shown in FIG. 2, since in the pinhole model the light rays of all the field angles are emitted from or introduced to the one point in the optical system 105, the distortion component has an identical shape regardless of a distance in an optical axis direction in which an optical axis 106 of the optical system 105 extends. For this reason, it is sufficient for the correction of the distortion component to provide only one function.

Figure 3:
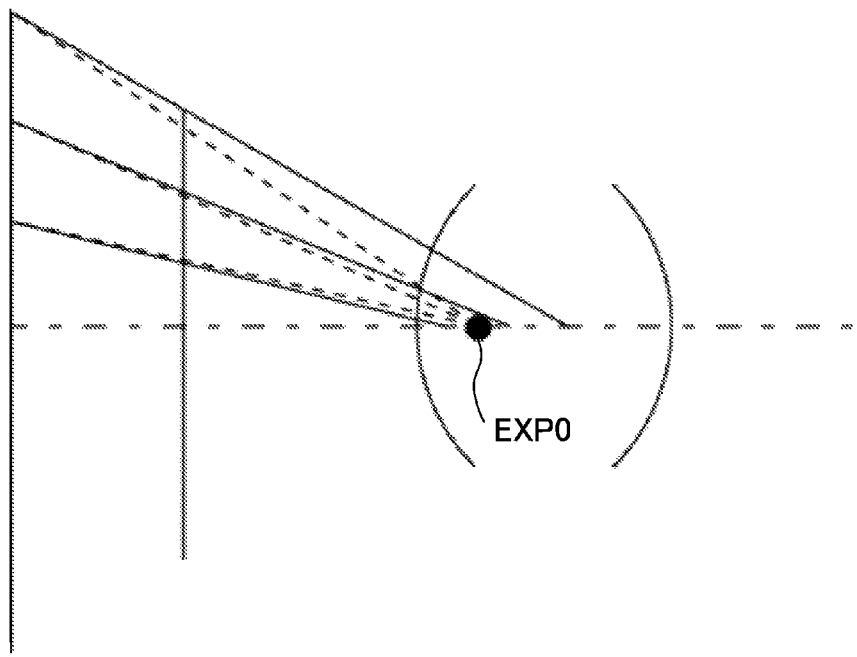
FIG. 3 shows an actual optical system in Embodiment 1.

However, actually, as shown in FIG. 3, a position of an exit pupil (hereinafter referred to as "an exit pupil position) of the projection optical system and a position of an entrance pupil (hereinafter referred to as "an entrance pupil position) of the imaging optical system differ for the respective field angles. Therefore, the light ray of each field angle assumed in the pinhole model, which is shown by a dashed line in FIG. 3, has a gap with a light ray of each field angle in an actual optical system, which is shown by a solid line. As a result, when the correction of the distortion component is performed with reference to a back side in the optical axis direction, though the correction for the back side can be sufficiently performed, an error is generated at a front side in the optical axis direction.

Figure 4:
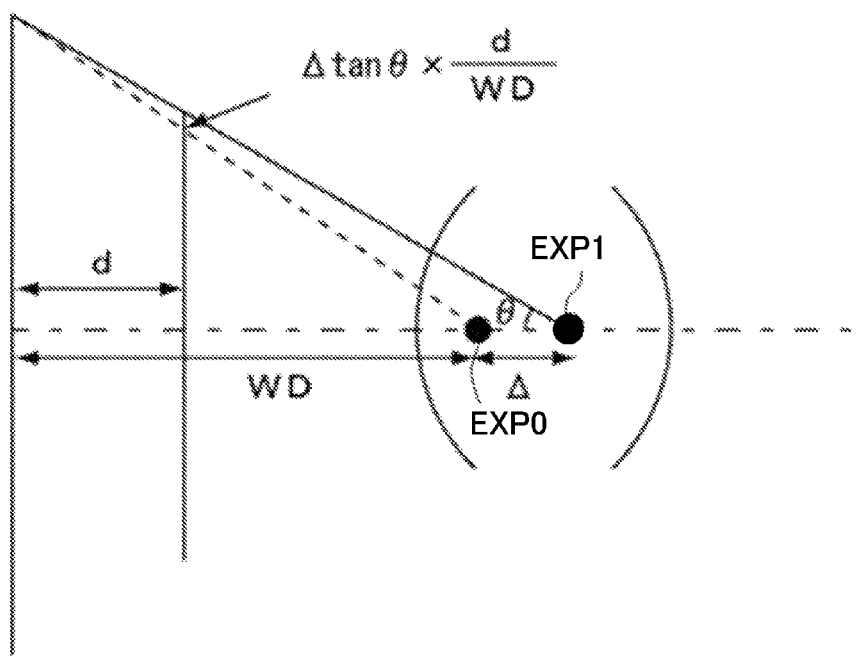
FIG. 4 shows an error between the actual optical system and the pinhole model.

As shown in FIG. 4, when assuming that the actual exit pupil position EXP1 of the projection optical system for the light ray of a field angle θ is shifted by a shift amount Δ with respect to the exit pupil position (EXP0) in the pinhole model, a correction residual of the distortion (hereinafter referred to as "distortion correction residual") at a plane more front by d (a position of the plane is hereinafter also referred to as "a d-front position") than a reference plane in a measurable depth range that is a measurable range in a depth direction (optical axis direction) in which the shape of the object 104 can be measured through the imaging optical system is expressed by following expression (1):

$$\Delta \tan \theta \times d/WD \quad (1)$$

where WD represents a distance from the exit pupil position in the pinhole model to the reference plane.

This embodiment uses, as "a light ray of a field angle", a principal ray that is a light ray existing at a center of a light flux forming that field angle and calculates the exit pupil position by using the principal ray as a reference. However, a light ray existing at a centroid of the above-mentioned light flux may be used as the principal ray. This also applies to Embodiment 2 described later.

The above distortion correction residual generates an error in the optical axis direction. When BL represents a base length in the triangulation, that is, a distance (interval) of the optical axis of the projection optical system and the optical axis of the imaging optical system, the error in the optical axis direction is expressed by following expression (2):

$$\Delta \tan \theta \times d/WD \times (WD-d)/BL \approx \Delta \tan \theta \times d/BL \quad (2)$$

This embodiment assumes that a maximum field angle (hereinafter referred to as "a measurable maximum field angle") of the projection optical system in a measurable in-plane range that is a measurable range where the shape of the object 104 can be measured through the imaging optical system in a projection in-plane direction (which is an in-plane direction of a plane orthogonal to the optical axis direction of the projection optical system) is 26 degrees, the distance WD is 2000 mm, the measurable depth range is ±300 mm, and the base length BL is 200 mm.

With this assumption, when the actual exit pupil position of the projection optical system for a light ray of a field angle of 26 degrees is shifted by 1 mm from the exit pupil position in the pinhole model, the distortion correction residual at a 300 mm-front position is calculated as 0.07 mm by using expression (1), and the error in the optical axis direction is calculated as 0.7 mm by using expression (2).

In the three-dimensional shape measurement, not only the error due to the distortion correction residual of the projection optical system, but also errors due to blur generated by each of the projection and imaging optical systems, noise generated in the image capturing apparatus and an influence of an environment light are generated. The distortion correction residual is an error which is generated regardless of a measurement environment and an object to be measured and which is an error systematically added, so that the distortion correction residual is desirable to be small, specifically to be 10% or less of a target measurement accuracy.

This embodiment sets the target measurement accuracy in the depth direction of the object 104 to 1 mm or less. In this case, when the actual exit pupil position for a light ray of the measurable maximum field angle is shifted by 1 mm from the exit pupil position in the pinhole model, the error in the optical axis direction due to the distortion correction residual is 0.7 mm, which corresponds to 70% of the target measurement accuracy. The exit pupil position in the pinhole model is generally located between the exit pupil position of the projection optical system and the actual exit pupil position for the light ray of the measurable maximum field angle. For this reason, it is necessary to suppress the shift amount Δ of the actual exit pupil position for the light ray of the measurable maximum field angle from the exit pupil position of the projection optical of the projection apparatus 101 in this embodiment to 0.15 mm or less.

In this case, dividing the shift amount Δ of the actual exit pupil position EXP1 for the light ray of the measurable maximum field angle from the exit pupil position EXP0 of the projection optical system (the shift amount Δ is hereinafter simply referred to as "an exit pupil position shift amount") by the base length BL results in a value of 0.00075.

This embodiment requires that this value is 0.0015 or less, in other words, requires satisfying a condition expressed by following expression (3) for a projection light (projection wavelength) projecting the optical pattern:

$$|EXP0-EXP1|/BL \leq 0.0015 \quad (3)$$

A value greater than 0.0015 which is obtained by dividing an excessively large exit pupil position shift amount Δ by the base length BL increases the distortion correction residual for the light ray of the measurable maximum field angle, which undesirably results in increase in the error in the optical axis direction. On the other hand, a value greater than 0.0015 which is obtained by dividing the exit pupil position shift amount Δ by an excessively short base length BL increases contribution of the distortion correction residual to the error in the optical axis direction, which also undesirably results in increase in the error in the optical axis direction.

Furthermore, this embodiment is desirable for the projection light (projection wavelength) to satisfy a condition expressed by following expression (4) where EXP2 represents an actual exit pupil position of the projection optical system for a light ray of an intermediate field angle in the measurable in-plane range:

$$|EXP0-EXP1|<|EXP0-EXP2| \quad (4)$$

This is because, as understood from expression (2), when the exit pupil position shift amount Δ is fixed, the error in the optical axis direction increases as the field angle increases. Therefore, the exit pupil position shift amount Δ for the light ray of the measurable maximum field angle in the measurable in-plane range is desirable to be smaller than that for the light ray of the intermediate field angle therein.

Figure 5:
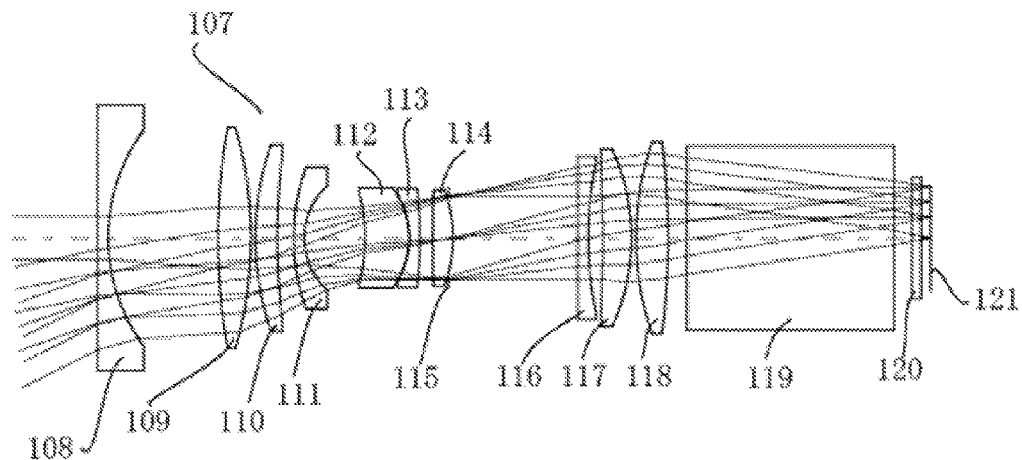
FIG. 5 shows a configuration of a projection optical system of a projection apparatus used for the three-dimensional shape measurement system of Embodiment 1.

FIG. 5 shows a specific configuration of a projection optical system 107 of the projection apparatus 101. FIG. 5 also shows optical paths of light rays passing through the projection optical system 107. The projection optical system 107 includes, in order from an object side (left side in the figure), a first lens 108, a second lens 109, a third lens 110 and a fourth lens 111. The projection optical system 107 further includes a fifth lens 112, a sixth lens 113, a seventh lens 114, an aperture stop 115, an eighth lens 116, a ninth lens 117, a tenth lens 118, a prism 119 and a cover glass 120. The fifth lens 112 and the sixth lens 113 constitute a cemented lens.

Reference numeral 121 denotes a light modulator that modulates light from a light source (not shown) to form the optical pattern. As the light modulator 121, a digital micromirror device (DMD), a liquid crystal display element, an organic electroluminescent (EL) device or the like can be used.

In this embodiment, the projection optical system 107 has a focal length of 12 mm and an F-number (Fno) of 2.4. The prism 119 splits the light proceeding from the light source toward the light modulator 121 and light proceeding from the light modulator 121 toward the projection optical system 107. As the prism 119, a TIR prism utilizing total internal reflection or other prisms can be used when the DMD is used as the light modulator 121.

Table 1 shows optical data of a numerical example of the projection optical system 107. In Table 1, SURF represents an ordinal number i of each surface counted from the object side (projection surface side), dst represents a distance of an i-th surface and a (i+1)-th surface, and r represents a radius of curvature of the i-th surface. Furthermore, typ represents a surface shape, and SPH represents that the surface shape is a spherical surface shape. In this embodiment, the first to tenth lenses 108 to 118 are each a spherical lens. Nd and vd respectively represent a refractive index and an Abbe number of a material between the i-th surface and the (i+1)-th surface.

TABLE 1

| SURF | dst | r | typ | Nd | vd |
|---|---|---|---|---|---|
| PROJECTION SURFACE | 2000 | | | | |
| 1 | 1.20 | −2038.69 | SPH | 1.620 | 60.3 |
| 2 | 12.49 | 20.45 | SPH | | |
| 3 | 3.77 | 69.67 | SPH | 1.755 | 27.6 |
| 4 | 0.50 | −45.06 | SPH | | |
| 5 | 2.49 | 31.87 | SPH | 1.755 | 27.6 |
| 6 | 1.88 | 72.98 | SPH | | |
| 7 | 1.20 | 23.65 | SPH | 1.487 | 70.4 |
| 8 | 6.95 | 7.94 | SPH | | |
| 9 | 5.00 | −18.15 | SPH | 1.742 | 45.0 |
| 10 | 0.01 | −9.48 | SPH | 1.742 | 45.0 |
| 11 | 1.20 | −9.48 | SPH | 1.755 | 27.6 |
| 12 | 1.50 | −58.97 | SPH | | |
| 13 | 2.31 | 228.53 | SPH | 1.487 | 70.4 |
| 14 | −0.50 | −15.19 | SPH | | |
| STOP | 14.72 | | | | |
| 16 | 1.20 | ∞ | SPH | 1.755 | 27.6 |
| 17 | 1.62 | 41.86 | SPH | | |
| 18 | 3.30 | −191.32 | SPH | 1.744 | 44.9 |
| 19 | 0.50 | −23.82 | SPH | | |
| 20 | 3.65 | 32.72 | SPH | 1.744 | 44.9 |
| 21 | 2.13 | −88.66 | SPH | | |
| 22 | 23.64 | ∞ | SPH | 1.517 | 64.2 |
| 23 | 2.00 | ∞ | SPH | | |
| 24 | 1.05 | ∞ | SPH | 1.507 | 63.3 |
| 25 | 1.11 | ∞ | SPH | | |
| LIGHT MODULATOR | | | | | |

In this numerical example, an exit pupil position of the projection optical system 107 in the pinhole model is located at a position identical to that of an exit pupil position of the projection optical system 107; the position is away from an object-side surface of the first lens 108 toward the light modulator 121 by 19.58 mm. An actual exit pupil position of the projection optical system 107 for the light ray of the measurable maximum field angle is located at a position away from the object-side surface of the first lens 108 toward the light modulator 121 by 19.66 mm. Thus, the exit pupil position shift amount Δ for the light ray of the measurable maximum field angle is 0.08 mm, which is smaller than 0.15 mm.

In this numerical example, the error in the optical axis direction due to the distortion correction residual for the light ray of the measurable maximum field angle is calculated as 0.06 mm by expression (2), which is suppressed to below 10% of the target measurement accuracy of 1 mm, and expression (3) provides a value of 0.0004. This value is smaller than 0.0015, so that the error in the optical axis direction due to the distortion correction residual is small.

Figure 6A:
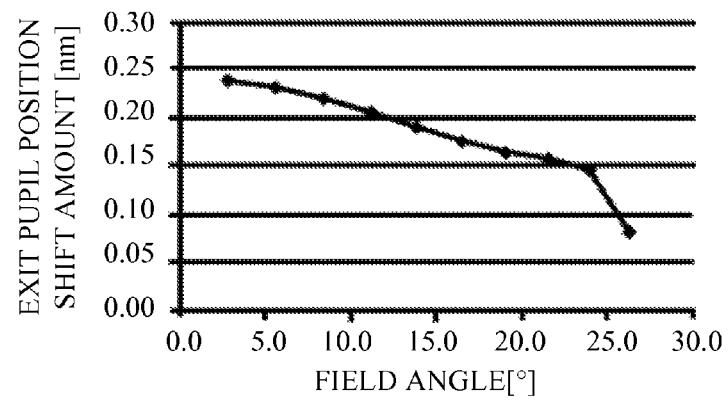
FIG. 6A shows a relation between a field angle and a shift amount of an exit pupil position of the projection optical system in Embodiment 1.

FIG. 6A shows the exit pupil position shift amounts of the projection optical system 107 for the light rays of the respective field angles in the measurable in-plane range. As understood from FIG. 6A, the exit pupil position shift amount Δ decreases as the field angle increases.

Figure 6B:
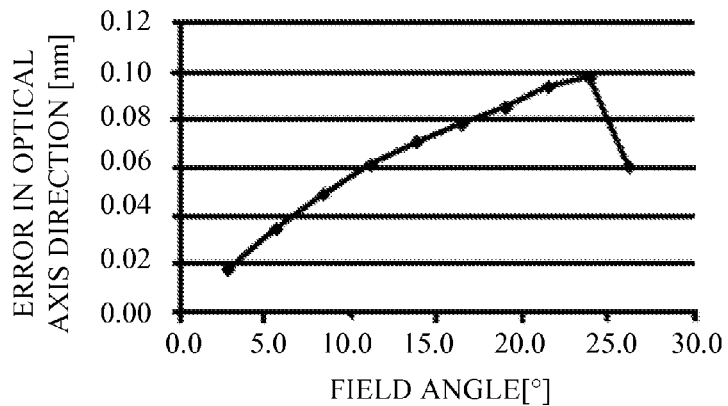
FIG. 6B shows a relation between the field angle and an error in an optical axis direction of the projection optical system in Embodiment 1.

FIG. 6B shows the errors in the optical axis direction for the light rays of the respective field angles in the measurable in-plane range. As understood from FIG. 6B, the error in the optical axis direction over an entire range of the field angle is suppressed to 0.1 mm or less.

Figure 7:
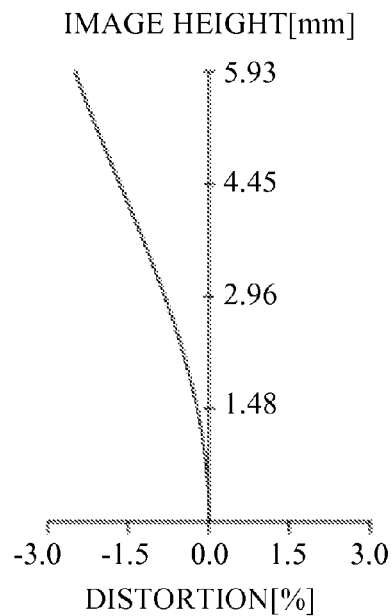
FIG. 7 shows distortion of the projection optical system in Embodiment 1.

FIG. 7 shows the distortion of the projection optical system 107. Since all the lenses included in the projection optical system 107 are spherical lenses, the distortion monotonously increases as the field angle (image height) increases. For this reason, when fitting the distortion with a function and correcting the function, it is possible to fit the distortion with a low-order function, which enables reducing number of parameters of the function to be used for the fitting and therefore enables calculating the parameters quickly and stably.

This embodiment sufficiently corrects the distortion while suppressing the exit pupil position shift amount for the light ray of the measurable maximum field angle to a small value. Therefore, this embodiment provides, respectively to a pair of the first and second lenses 108 and 109 and to a pair of the third and fourth lenses 110 and 111, a relation to cancel out their distortions.

The first lens 108 has a biconcave shape and a negative optical power (an optical power is an inverse of a focal length). The second lens 109 has a biconvex shape and a positive optical power. The first and second lenses 108 and 109 cancel out their distortions by using their negative and positive optical powers. The first lens 108 has a focal length f1 of −32.11 mm, and the second lens 109 has a focal length f2 of 35.48 mm; a ratio f1/f2 of these focal lengths is −0.905. Cancelling the distortion generated at the first lens 108 from which light rays of large field angles exit by the distortion generated at the second lens 109 having an optical power approximately equal to that of the first lens 108 enables suppressing a resultant distortion generated at the first and second lenses 108 and 109 to be small.

The ratio f1/f2 of the focal lengths of the first and second lenses 108 and 109 is desirable to be between −1.1 and −0.9, that is, to satisfy a condition expressed by following expression (5):

$$-1.1 < f1{-}/f2 < -0.9 \qquad (5)$$

A value of f1/f2 lower than the lower limit of expression (5) excessively increases the positive power of the first lens 108, which undesirably makes impossible to correct the distortion generated at the first lens 108 by the second lens 109. A value of f1/f2 higher than the upper limit of expression (5) excessively increases the negative power of the second lens 109, which invites excessive correction of the distortion generated at the first lens 108 by the second lens 109. As a result, the distortion generated at the second lens 109 remains, which is undesirable.

The third lens 110 is a meniscus lens that has a convex surface facing toward the object side and has a positive optical power. The fourth lens 111 is a meniscus lens that has a convex surface facing toward the object side and has a negative optical power. The third and fourth lenses 110 and 111 cancel out their distortions by using their positive and negative optical powers. Furthermore, as shown in FIG. 5, the third lens 110 has a concentric shape for light rays entering it, which suppresses generation of aberration at the third lens 110 by allowing passage of the entering light rays without significantly refracting them.

The object-side convex surface of the third lens 110 has a radius of curvature r5 of 31.87 mm, and a light modulator-side concave surface (which is an opposite side surface to the object-side surface) thereof has a radius of curvature r6 of 72.98 mm. A shape factor (r6+r5)/(r6−r5) of the third lens 110 is 2.55.

In order to provide a concentric shape to the third lens 110, the shape factor of the third lens 110 is desirable to be between 2.5 and 3.5, in other words, to satisfy a condition expressed by following expression (6):

$$2.5 < (r6+r5)/(r6-r5) < 3.5 \tag{6}$$

A shape factor lower than the lower limit of expression (6) not only cannot provide to the third lens 110 the concentric shape for the entering light rays, but also excessively decreases the radius of curvature of the object-side convex surface of the third lens 110 and thereby undesirably makes it difficult to manufacture the third lens 110. On the other hand, a shape factor higher than the upper limit of expression (6) excessively decreases the positive optical power of the third lens 110, which undesirably collapses the distortion cancellation relation between the third and fourth lenses 110 and 111.

The fourth lens 111 has, as well as the third lens 110, a concentric shape for light rays entering it. The object-side convex surface of the fourth lens 111 has a radius of curvature r7 of 23.65 mm, and a light modulator-side concave surface thereof has a radius of curvature r8 of is 7.94 mm. A shape factor (r8+r7)/(r8−r7) of the fourth lens 111 is −2.01.

In order to provide a concentric shape to the fourth lens 111, the shape factor of the fourth lens 110 is desirable to be between −3 and −2, in other words, to satisfy a condition expressed by following expression (7):

$$-3 < (r8+r7)/(r8-r7) < -2 \tag{7}$$

A shape factor lower than the lower limit of expression (7) not only cannot provide to the fourth lens 111 the concentric shape for the entering light rays, but also excessively decreases the negative optical power of the fourth lens 111, which undesirably results in collapse of the distortion cancellation relation between the third and fourth lenses 110 and 111. On the other hand, a shape factor higher than the upper limit of expression (7) excessively decreases the radius of curvature of the light modulator-side concave surface of the fourth lens 111 and thereby undesirably makes it difficult to manufacture the fourth lens 111.

Although this embodiment provides to the projection optical system of the projection apparatus a small exit pupil position shift amount for the light ray of the measurable maximum field angle, this projection optical system may be used as an imaging optical system of an image capturing apparatus.

That is, when, for an image capturing light entering the imaging optical system from the object 104 onto which the optical pattern is projected, ENP0 represents an entrance pupil position of the imaging optical system, and ENP1 represents an actual entrance pupil position of the imaging optical system for a light ray of a measurable maximum field angle, the imaging optical system is desirable to satisfy a condition expressed by following expression (8):

$$|ENP0-ENP1|/BL \leq 0.0015 \tag{8}$$

As well as the projection optical system of the projection apparatus, a small shift amount of the actual entrance pupil position of the imaging optical system for the light ray of the measurable maximum field angle with respect to the entrance pupil position in the pinhole model can reduce the error in the optical axis direction.

In addition to satisfaction of the condition of expression (8), the imaging optical system is more desirable to satisfy the above-described conditions of expressions (4) to (7).

Although this embodiment described the case of detecting the edge position in the bright and dark pattern with the negative-positive intersection detection method, other edge position detection methods may be used such as a method using a differential filter and a method detecting a centroid of an intensity distribution. Moreover, the method measuring the three-dimensional shape is not limited to the above-described spatial coding method, and a phase shift method projecting a sinusoidal optical pattern onto an object or an optical cutting method projecting a linear optical pattern thereonto may be used.

Embodiment 2

Figure 8:
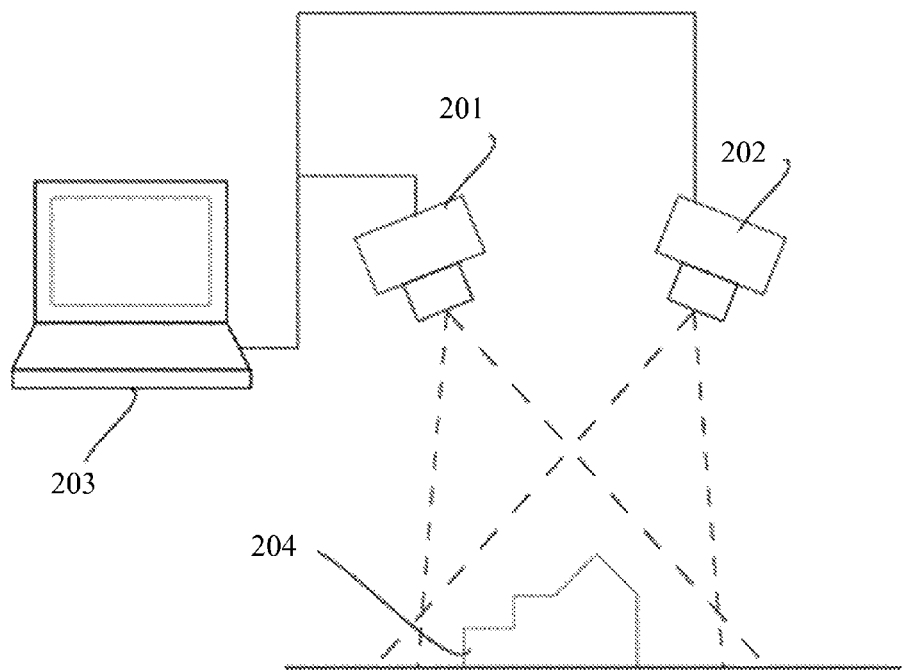
FIG. 8 shows a configuration of a three-dimensional shape measurement system that is Embodiment 2 of the present invention.

FIG. 8 shows a configuration of a three-dimensional shape measurement system that is Embodiment 2 of the present invention. The three-dimensional shape measurement system of this embodiment is constituted by a first image capturing apparatus 201, a second image capturing apparatus 202 and a control/processing apparatus 203.

The first and second image capturing apparatuses 201 and 202 perform image capturing of an object 204 from mutually different two places (that is, from two directions). The control/processing apparatus 203 is constituted by a personal computer and controls operations of the first and second image capturing apparatuses 201 and 202. The control/processing apparatus 203 further performs a process to measure a three-dimensional shape of the object 204 by using captured images produced (acquired) by the first and second image capturing apparatuses 201 and 202.

The three-dimensional shape measurement system of this embodiment performs a three-dimensional shape measurement by a stereo method. In the shape measurement, since imaging optical systems of the first and second imaging capturing apparatuses 201 and 202 each have distortion, in order to accurately measure the shape of the object 204, it is necessary to correct a distortion component that is an image component corresponding to the distortion contained in each captured image. For this reason, the control/processing apparatus 203 in this embodiment performs, as in Embodiment 1, a process to correct the distortion component by assuming that each imaging optical system is an optical system of a pinhole model.

This embodiment assumes that a maximum field angle (hereinafter referred to as "a measurable maximum field angle) of each imaging optical system in a measurable in-plane range that is a measurable range where the shape of the object 204 can be measured through the imaging optical system in an image-capturing in-plane direction (which is an in-plane direction of a plane orthogonal to an optical axis direction of the imaging optical system) is 18 degrees, a distance WD that is a distance from the entrance pupil position in the pinhole model to a reference plane is 1000 mm, a measurable depth range that is a measurable range in a depth direction (optical axis direction) in which the shape of the object 204 can be measured through the imaging optical system is ±200 mm, and a base length BL that is a distance between optical axes of the imaging optical systems of the first and second image capturing apparatuses 201 and 202 is 300 mm.

With this assumption, when the actual entrance pupil position of the imaging optical system for a light ray of a field angle of 18 degrees is shifted by 1 mm from the entrance pupil position in the pinhole model, a distortion correction residual at a 200 mm-front position is calculated as 0.06 mm by using expression (1), and the error in the optical axis direction is calculated as 0.22 mm by using expression (2).

This embodiment sets a target measurement accuracy in the depth direction of the object 204 to 0.5 mm or less. In this case, when the actual entrance pupil position for a light ray of the measurable maximum field angle is shifted by 1 mm from the entrance pupil position in the pinhole model, the error in the optical axis direction due to the distortion correction residual is 0.22 mm which corresponds to 40% of the target measurement accuracy. The entrance pupil position in the pinhole model is generally located between the entrance pupil position of the imaging optical system and the actual entrance pupil position for the light ray of the measurable maximum field angle. For this reason, it is necessary to suppress a shift amount Δ of the actual entrance pupil position for the light ray of the measurable maximum field angle from the entrance pupil position of the imaging optical system of each of the first and second image capturing apparatus 201 and 202 to 0.23 mm or less.

In this case, dividing the shift amount (hereinafter referred to as "an entrance pupil position shift amount) Δ of the actual exit pupil position ENP1 for the light ray of the measurable maximum field angle from the entrance pupil position ENP0 of the imaging optical system by the base length BL results in a value of 0.00077. This embodiment requires that this value is 0.0015 or less, in other words, requires satisfying a condition expressed by following expression (9) for the image capturing light (image capturing wavelength) entering from the object 204:

$$|ENP0-ENP1|/BL \leq 0.0015 \quad (9)$$

The reason therefor is the same as that explained for expression (3) in Embodiment 1.

Furthermore, this embodiment is desirable for the image capturing light (image capturing wavelength) to satisfy a condition expressed by following expression (10) where ENP2 represents an actual entrance pupil position of the imaging optical system for a light ray of an intermediate field angle in the measurable in-plane range:

$$|ENP0-ENP1| < |ENP0-ENP2| \quad (10)$$

Figure 9:
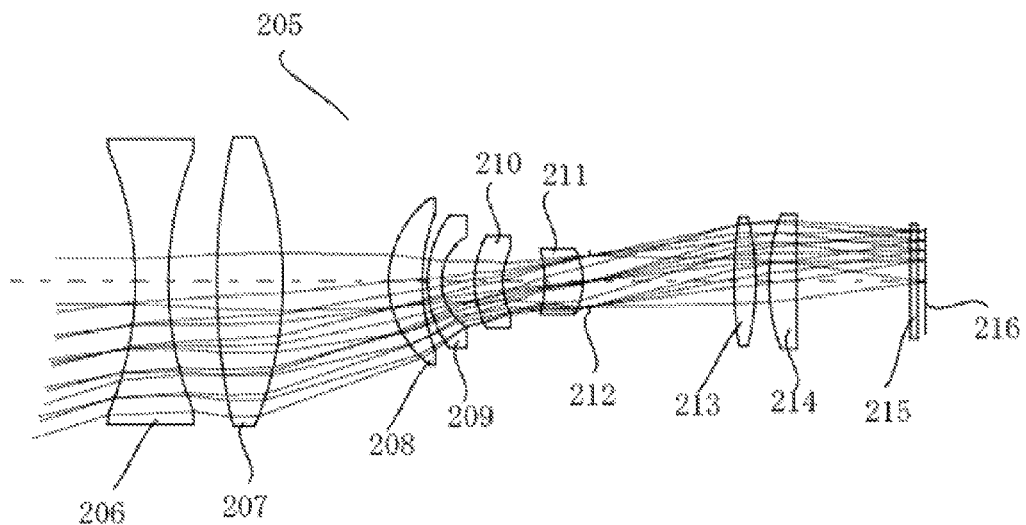
FIG. 9 shows a configuration of an imaging optical system of an image capturing apparatus used for the three-dimensional shape measurement system of Embodiment 2.

The reason therefor is the same as that explained for expression (4) in Embodiment 1. FIG. 9 shows a specific configuration of an imaging optical system 205 common to the first and second image capturing apparatuses 201 and 202. FIG. 9 also shows optical paths of light rays passing through the imaging optical system 205. The imaging optical system 205 includes, in order from an object side (left side in the figure), a first lens 206, a second lens 207, a third lens 208 and a fourth lens 209. The imaging optical system 205 further includes a fifth lens 210, a sixth lens 211, an aperture stop 212, a seventh lens 213, an eighth lens 214 and a cover glass 215. Reference numeral 216 denotes an image sensor that converts an optical image of the object 204 which is formed by the imaging optical system 205 into an electric signal. As the image sensor 216, a CCD sensor, a CMOS sensor or the like can be used.

In this embodiment, the imaging optical system 205 has a focal length of 25 mm and an F-number (Fno) of 2.4.

Table 2 shows optical data of a numerical example of the imaging optical system 205. In Table 2, SURF represents an ordinal number i of each surface counted from the object side (image-captured surface side), and dst, r, typ (SPH), Nd and vd represent identical data to those in Table 1.

TABLE 2

| SURF | dst | r | typ | Nd | vd |
|---|---|---|---|---|---|
| IMAGE-CAPTURED SURFACE | 1000 | | | | |
| 1 | 5.00 | −50.90 | SPH | 1.487 | 70.4 |
| 2 | 7.31 | 52.28 | SPH | | |
| 3 | 10.00 | 97.15 | SPH | 1.745 | 42.8 |
| 4 | 16.01 | −57.80 | SPH | | |
| 5 | 5.08 | 15.84 | SPH | 1.653 | 54.6 |
| 6 | 0.78 | 28.77 | SPH | | |
| 7 | 2.14 | 16.64 | SPH | 1.755 | 27.6 |
| 8 | 5.00 | 8.11 | SPH | | |
| 9 | 4.27 | 14.65 | SPH | 1.755 | 27.6 |
| 10 | 6.37 | 10.77 | SPH | | |
| 11 | 5.72 | −15.52 | SPH | 1.542 | 65.3 |
| 12 | 1.00 | −10.68 | SPH | | |
| STOP | 21.86 | | | | |
| 14 | 3.30 | 62.16 | SPH | 1.487 | 70.4 |
| 15 | 1.99 | −39.64 | SPH | | |
| 16 | 4.10 | 29.17 | SPH | 1.487 | 70.4 |
| 17 | 17.29 | 759.66 | SPH | | |
| 18 | 1.05 | ∞ | SPH | 1.507 | 63.4 |
| 19 | 1.11 | ∞ | SPH | | |
| IMAGE SENSOR PLANE | | | | | |

In this numerical example, an entrance pupil position of the imaging optical system 205 in the pinhole model is located at a position identical to that of an entrance pupil position of the imaging optical system 205; the position is away from an object-side surface of the first lens 206 toward the image sensor 216 by 53.12 mm. An actual entrance pupil position of the imaging optical system 205 for the light ray of the measurable maximum field angle is also located at the position away from the object-side surface of the first lens 206 toward the image sensor 216 by 53.12 mm. Thus, the entrance pupil position shift amount for the light ray of the measurable maximum field angle is 0 mm, which is smaller than 0.23 mm.

In this numerical example, the error in the optical axis direction due to the distortion correction residual for the light ray of the measurable maximum field angle is calculated as 0 mm by expression (2), which is suppressed to below 10% of the target measurement accuracy of 1 mmm, and expression (9) provides a value of 0. This value is smaller than 0.0015, so that the error in the optical axis direction due to the distortion correction residual is small.

Figure 10A:
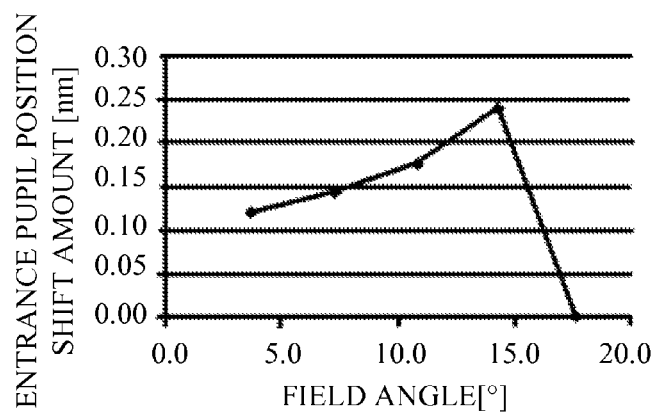
FIG. 10A shows a relation between a field angle and a shift amount of an entrance pupil position of the imaging optical system in Embodiment 2.
Figure 10B:
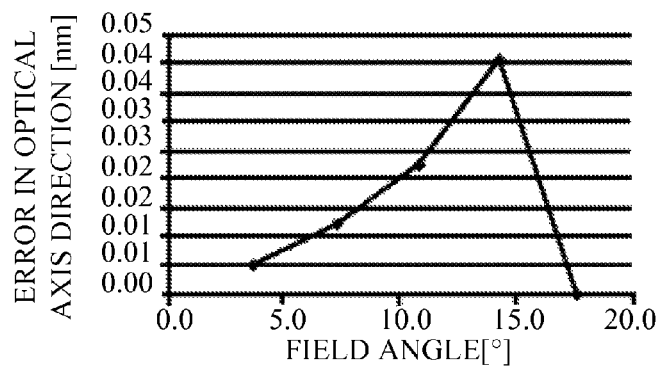
FIG. 10B shows a relation between the field angle and an error in an optical axis direction of the imaging optical system in Embodiment 2.

FIG. 10A shows the entrance pupil position shift amounts of the imaging optical system 205 for the light rays of the respective field angles in the measurable in-plane range. As understood from FIG. 10A, the entrance pupil position shift amount for the light ray of the maximum field angle in the measurable in-plane range is smaller than that for the light ray of the intermediate field angle therein. FIG. 10B shows the errors in the optical axis direction for the light rays of the respective field angles in the measurable in-plane range. As understood from FIG. 10B, the error in the optical axis direction over an entire range of the field angle is suppressed to 0.05 mm or less.

Figure 11:
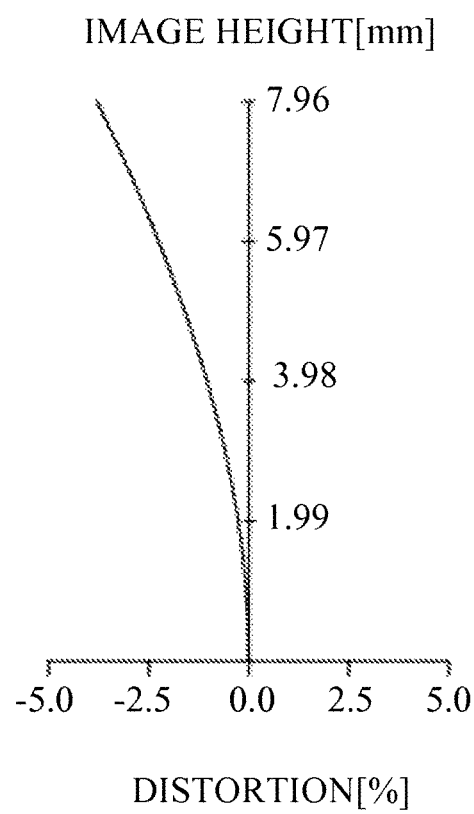
FIG. 11 shows distortion of the imaging optical system in Embodiment 2.

FIG. 11 shows the distortion of the imaging optical system 205. Since all the lenses included in the imaging optical system 205 are spherical lenses, the distortion monotonously increases as the field angle (image height) increases. For this reason, as in Embodiment 1, it is possible to fit the distortion with a low-order function, which enables reducing number of parameters of the function to be used for the fitting and therefore enables calculating the parameters quickly and stably.

As well as Embodiment 1, this embodiment also sufficiently corrects the distortion while suppressing the entrance pupil position shift amount for the light ray of the measurable maximum field angle to a small value. Therefore, this embodiment provides, respectively to a pair of the first and second lenses 206 and 207 and to a pair of the third and fourth lenses 208 and 209, a relation to cancel out their distortions.

The first lens 206 has a biconcave shape and a negative optical power. The second lens 207 has a biconvex shape and a positive optical power. The first and second lenses 206 and 207 cancel out their distortions by using their negative and positive optical powers. The first lens 206 has a focal length f1 of −51.38 mm, and the second lens 207 has a focal length f2 of 48.94 mm; a ratio f1/f2 of these focal lengths is −1.05. Cancelling the distortion generated at the first lens 206 where light rays of large field angles enter by the distortion generated at the second lens 207 having an optical power approximately equal to that of the first lens 206 enables suppressing a resultant distortion generated at the first and second lenses 206 and 207 to be small.

The ratio f1/f2 of the focal lengths of the first and second lenses 206 and 207 is desirable to satisfy the condition expressed by expression (5) described in Embodiment 1.

The third lens 208 is a meniscus lens that has a convex surface facing toward the object side and has a positive optical power. The fourth lens 209 is a meniscus lens that has a convex surface facing toward the object side and has a negative optical power. The third and fourth lenses 208 and 209 cancel out their distortions by using their positive and negative optical powers. Furthermore, as understood from FIG. 9, the third lens 208 has a concentric shape for light rays entering it, which suppresses generation of aberration at the third lens 208 by allowing passage of the entering light rays without significantly refracting them.

The object-side convex surface of the third lens 208 has a radius of curvature r5 of 15.84 mm, and an image sensor-side concave surface (which is an opposite side surface to the object-side surface) thereof has a radius of curvature r6 of is 28.77 mm. A shape factor (r6+r5)/(r6−r5) of the third lens 208 is 3.45. In order to provide a concentric shape to the third lens 208, the shape factor of the third lens 208 is desirable to satisfy the condition expressed by expression (6) described in Embodiment 1.

The fourth lens 209 has, as well as the third lens 208, a concentric shape for light rays entering it. The object-side convex surface of the fourth lens 209 has a radius of curvature r7 of 16.64 mm, and an image sensor-side concave surface thereof has a radius of curvature r8 of is 8.11 mm. A shape factor (r8+r7)/(r8−r7) of the fourth lens 209 is −2.9. In order to provide a concentric shape to the fourth lens 209, the shape factor of the fourth lens 209 is desirable to satisfy the condition expressed by expression (7) described in Embodiment 1.

Although this embodiment described the case of performing the three-dimensional shape measurement by the stereo method using two image capturing apparatuses, another stereo method may be employed which moves one image capturing apparatus to multiple (two or more) places and uses multiple captured images produced by the image capturing apparatus performing image capturing of the object at the multiple places.

Each of the above-described embodiments enables, while using the pinhole model, reducing the influence of the distortion of the projection optical system or the imaging optical system in the entire measurable range including the optical axis direction. Therefore, each embodiment can achieve a three-dimensional shape measurement system capable of sufficiently correcting the distortion component contained in the captured image and thereby of highly accurately measuring the three-dimensional shape of the object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076962, filed on Apr. 3, 2014, which is hereby incorporated by reference wherein in its entirety.

What is claimed is:

1. A projection apparatus to be used for a measurement system including the projection apparatus configured to project a projection light onto an object, and an image capturing apparatus provided with an imaging optical system and configured to perform, through the imaging optical system, image capturing of the object onto which the projection light is projected, the projection apparatus comprising:

a projection optical system through which the projection light is projected onto the object, wherein the projection optical system satisfies the following condition for the projection light:

$$|EXP0-EXP1|/BL \leq 0.0015$$

where EXP0 represents an exit pupil position of the projection optical system, EXP1 represents an actual exit pupil position of the projection optical system for a light ray of a maximum field angle in a measurable range for the object through the imaging optical system, and BL represents a base length between the projection optical system and the imaging optical system.

2. A projection apparatus according to claim 1, wherein the projection optical system satisfies the following condition for the projection light:

$$|EXP0-EXP1| < |EXP0-EXP2|$$

where EXP2 represents an actual exit pupil position of the projection optical system for a light ray of an intermediate field angle in the measurable range.

3. A projection apparatus according to claim 1, wherein the projection optical system comprising in order from an object side:

a first lens having a negative optical power;
a second lens having a positive optical power;
a third lens having a positive optical power; and
a fourth lens having a negative optical power.

4. A projection apparatus according to claim 3, wherein the first and second lenses satisfy the following condition:

$$-1.1 < f1/f2 < -0.9$$

where f1 represents a focal length of the first lens, and f2 represents a focal length of the second lens.

5. A projection apparatus according to claim 3, wherein the third lens is a meniscus lens that has a convex surface facing toward the object side and has a positive optical power, and the third lens satisfies the following condition:

$$2.5<(r6+r5)/(r6-r5)<3.5$$

where r5 represents a radius of curvature of the convex surface of the third lens, and r6 represents a radius of curvature of a concave surface of the third lens, which is an opposite side surface to the convex surface.

6. A projection apparatus according to claim 3, wherein the fourth lens is a meniscus lens that has a convex surface facing toward the object side and has a negative optical power, and the fourth lens satisfies the following condition:

$$-3<(r8+r7)/(r8-r7)<-2$$

where r7 represents a radius of curvature of the convex surface of the fourth lens, and r8 represents a radius of curvature of a concave surface of the fourth lens, which is an opposite side surface to the convex surface.

7. A measurement system comprising:

a projection apparatus provided with a projection optical system and configured to project a projection light through the projection optical system onto an object;

an image capturing apparatus provided with an imaging optical system and configured to perform, through the imaging optical system, image capturing of the object onto which the projection light is projected; and a processing apparatus configured to perform a process to measure the object by using a captured image acquired by the image capturing apparatus, wherein the projection optical system of the projection apparatus satisfies the following condition for the projection light:

$$|EXP0-EXP1|/BL \leq 0.0015$$

where EXP0 represents an exit pupil position of the projection optical system, EXP1 represents an actual exit pupil position of the projection optical system for a light ray at a maximum field angle in a measurable range for the object through the imaging optical system, and BL represents a base length between the projection optical system and the imaging optical system.

* * * * *